US009466845B2

(12) United States Patent
Bareis et al.

(10) Patent No.: US 9,466,845 B2
(45) Date of Patent: Oct. 11, 2016

(54) VALVE ASSEMBLY

(71) Applicant: BorgWarner Esslingen GmbH, Esslingen (DE)

(72) Inventors: Bernd Bareis, Taeferrot-Utzstetten (DE); Thy Nguyen, Stuttgart (DE); Sven Osswald, Fellbach (DE)

(73) Assignee: BORGWARNER ESSLINGEN GMBH, Esslingen (DE)

( * ) Notice: Subject to any disclaimer, the term of this patent is extended or adjusted under 35 U.S.C. 154(b) by 120 days.

(21) Appl. No.: 14/478,236

(22) Filed: Sep. 5, 2014

(65) Prior Publication Data
US 2015/0068626 A1    Mar. 12, 2015

(30) Foreign Application Priority Data
Sep. 10, 2013 (DE) .......................... 10 2013 109 891

(51) Int. Cl.
| H01M 8/04 | (2016.01) |
| F16K 11/22 | (2006.01) |
| F16K 27/00 | (2006.01) |
| H01M 8/04082 | (2016.01) |

(52) U.S. Cl.
CPC ............... *H01M 8/04* (2013.01); *F16K 11/22* (2013.01); *F16K 27/003* (2013.01); *H01M 8/04201* (2013.01); *Y02E 60/50* (2013.01); *Y10T 137/87265* (2015.04); *Y10T 137/87877* (2015.04)

(58) Field of Classification Search
CPC ... H01M 8/04; H01M 8/04201; F16K 11/22; F16K 27/003; F16K 27/0281; F16K 27/12; Y02E 60/50; Y10T 137/87265; Y10T 137/87887; Y10T 137/87885; Y10T 137/877

USPC ........ 137/883, 884, 861; 251/251, 253, 259, 251/263
See application file for complete search history.

(56) References Cited

U.S. PATENT DOCUMENTS

| 3,236,252 A | * | 2/1966 | Allingham ............ F16K 35/027 137/66 |
| 5,836,354 A | * | 11/1998 | Amano .................. B60T 8/368 137/884 |
| 5,967,188 A | * | 10/1999 | Chien-Chuan ........ F16K 27/003 137/861 |
| 6,889,709 B2 | | 5/2005 | Hanada et al. |

(Continued)

FOREIGN PATENT DOCUMENTS

| JP | 2001182860 A | 7/2001 |
| JP | 2006046562 A | 2/2006 |

(Continued)

*Primary Examiner* — Michael R Reid
(74) *Attorney, Agent, or Firm* — Hackler Daghighian Martino & Novak

(57) ABSTRACT

A valve assembly for supplying gas, in particular for supplying air to a fuel cell, includes a valve assembly having at least two individually controllable valves, a common housing, in which the valves are accommodated, including a common inlet and at least one outlet for each valve, wherein the housing is formed of at least two housing parts, wherein the common inlet is formed in a first housing part, said inlet being coupled to one valve in each case, and wherein the valves are accommodated in a second housing part, wherein the two housing parts are sealed with respect to one another by means of assigned joining surfaces, wherein at least one valve seat for a valve is provided at the joining surface of the first housing part, said valve seat being closable with a sealing surface of the valve.

16 Claims, 2 Drawing Sheets

(56) References Cited

U.S. PATENT DOCUMENTS

2006/0060253 A1 3/2006 Yoshida et al.
2009/0235766 A1* 9/2009 Keefover .............. F16K 31/047
　　　　　　　　　　　　　　　　　　　　　74/55

FOREIGN PATENT DOCUMENTS

| JP | 2009180333 A | 8/2009 |
|---|---|---|
| JP | 2011220422 A | 11/2011 |
| WO | 2012159689 A1 | 11/2012 |

* cited by examiner

VALVE ASSEMBLY

CROSS-REFERENCE TO RELATED APPLICATIONS

This application claims priority to German Patent Application No. 10 2013 109 891.6, filed Sep. 10, 2013, the entire contents of which are hereby incorporated by reference.

DESCRIPTION

1. Field of the Invention

The present invention relates to a valve assembly for supplying gas, in particular for supplying air to a fuel cell.

2. Background of the Invention

Fuel cells for vehicles, which are used, e.g., to supply power to a commercial vehicle, must be supplied with air via a plurality of valves, which are continuously controllable.

Valve assemblies for supplying air to fuel cells have so far been formed of single valves, which were installed in a receiving housing.

The disadvantages of such an embodiment are a large overall size, a large weight, and high overall production costs due to the plurality of individual parts, each of which has a plurality of machined surfaces.

Proceeding from this background, the object of the invention is that of creating a valve assembly for supplying gas, which is suitable, in particular, for supplying air to a fuel cell. The overall size and weight of the entire assembly should be kept as small as possible. Preferably, the production costs should also be reduced and it should be possible, overall, to achieve the greatest possible reliability.

SUMMARY OF THE INVENTION

This object has been achieved in the case of a valve assembly according to the initially stated type by virtue of the fact that the two housing parts are sealed with respect to one another by means of assigned joining surfaces, wherein at least one valve seat for a valve is provided at the joining surface of the first housing part, said valve seat being closable by a sealing surface of the valve.

The problem addressed by the invention is solved in entirety in this manner.

In the valve assembly according to the invention, the gas is supplied via a common inlet via a first housing part, while the valves are installed in a second housing part. The arrangement is now embodied such that at least one valve seat for a valve is provided at the joining surface of the first housing part, said valve seat being closable by the sealing surface of the valve. This embodiment is preferably provided for all the valves, provided these are quantity control valves. This results in simplified assembly and good accessibility of the valves. Since the valves are supplied via a common gas inlet by means of the first housing part, separate feed lines are eliminated, thereby further simplifying the design and reducing the weight.

In an advantageous embodiment of the invention, the sealing surface of the valve is embodied as a valve disk, which is embodied on a valve tappet.

In this manner, a valve having a valve disk can be obtained, which advantageously seals by means of the valve disk thereof directly on the valve seat at the joining surface of the first housing part. This design is preferably provided for all the valves, provided these are quantity control valves.

According to a further embodiment of the invention, at least one of the valves is continuously controllable by means of an actuator.

Automatic adjustment is made possible in this manner.

In a further advantageous embodiment of the invention, at least one of the valves is automatically controllable by means of a rotary actuator, wherein integrated position detection is preferably provided.

Particularly precise controllability is thereby made possible.

According to a further embodiment of the invention, the valve tappet can be adjusted by means of a rotary actuator having a coupling device, preferably in the form of a cam disk.

As a result, the disk valve can be controlled in a simple and reliable manner, wherein an adaptation to predetermined control characteristics can be easily implemented.

According to a further advantageous embodiment of the invention, the valve opens in the flow direction and is acted upon by a spring in the closing direction.

Such an inverse arrangement of the valve results in a very low loss of pressure in the maximally opened state. At the same time, a low leakage in the closed state can be achieved.

The spring is preferably embodied as a failsafe spring.

It is thereby ensured that the valve always transitions into the desired emergency state thereof, even if the valve control fails.

According to a further embodiment of the invention, one of the valves is embodied as a switching valve having two outlets, wherein a common valve inlet is embodied at the joining surface of the first housing part.

A simple and reliable design is therefore ensured in the event that one of the valves is intended to be designed as a switching valve.

In this case, the switching valve preferably comprises a valve flap, which can be actuated by means of a rotary actuator.

A simple and reliable design is thereby ensured.

Preferably, the housing can be made of light metal, such as an aluminum alloy, or plastic.

This results in simple and cost-effective production with high precision. If a light-metal alloy is used for the production, a die casting method is preferred, whereas an injection molding procedure is preferred if plastic is used for the production.

According to a further embodiment of the invention, all valves have a valve inlet, which is embodied at the joining surface of the first housing part.

A particularly simple design and simple assembly are thereby ensured.

According to a further embodiment of the invention, the first housing part encloses a collecting chamber coupled to the inlet, said collecting chamber being closable by means of a cover.

The assembly is simplified in this manner. Maintenance can also be more easily performed as a result.

It is understood that the features of the invention mentioned above and which are described below may be used not only in the particular combination described, but may also be used in other combinations or alone, without leaving the scope of the invention.

Further features and advantages of the invention become apparent from the description of a preferred exemplary embodiment that follows, with reference to the drawings.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
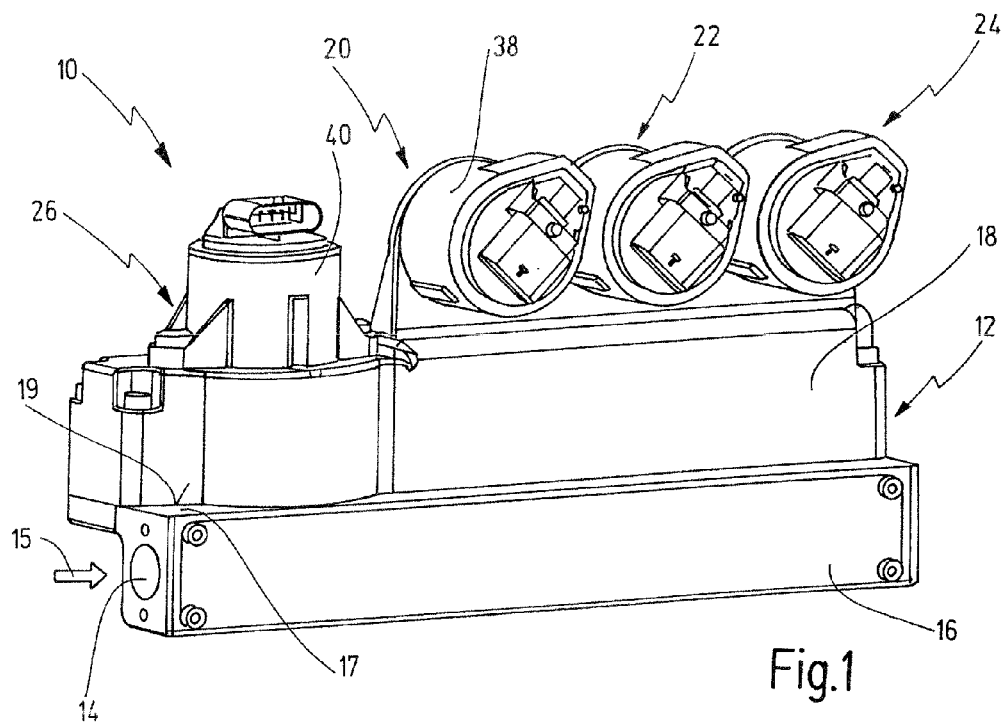
FIG. 1 shows a perspective view of a valve assembly according to the invention.

FIG. 1 shows a valve assembly according to the invention, in a perspective view, wherein said valve assembly is labeled as a whole with reference sign 10.

This is a valve assembly 10 for supplying air to a fuel cell having a total quantity of three control valves 20, 22, 24 and one switching valve 26.

It is understood that any number or quantity of control valves and any number of switching valves can be combined with one another, depending on the application.

The valve assembly 10 comprises a common housing 12, which has a first housing part 16, in which a common inlet 14 is provided, via which air can be supplied as indicated by the arrow 15. The housing 12 further comprises a second housing part 18, which is connected in a sealing manner to an assigned joining surface 17 of the first housing part 16, at a joining surface 19, which is preferably flat.

The design is implemented such that the valves 20, 22, 24 for controlling the air flow and the switching valve 26 are accommodated in the second housing part 18, while the valve inlets, however, are provided directly on the two joining surfaces 17, 19 between the two housing parts 16, 18. A particularly simple design and simple assembly are thereby made possible.

FIG. 1 also shows actuators 38 and 40, which are embodied as rotary actuators and are used for the automatic actuation of the valves 20 to 24 or 26, respectively.

This will be described in more detail in the following with reference to FIGS. 2 to 4.

Figure 2:
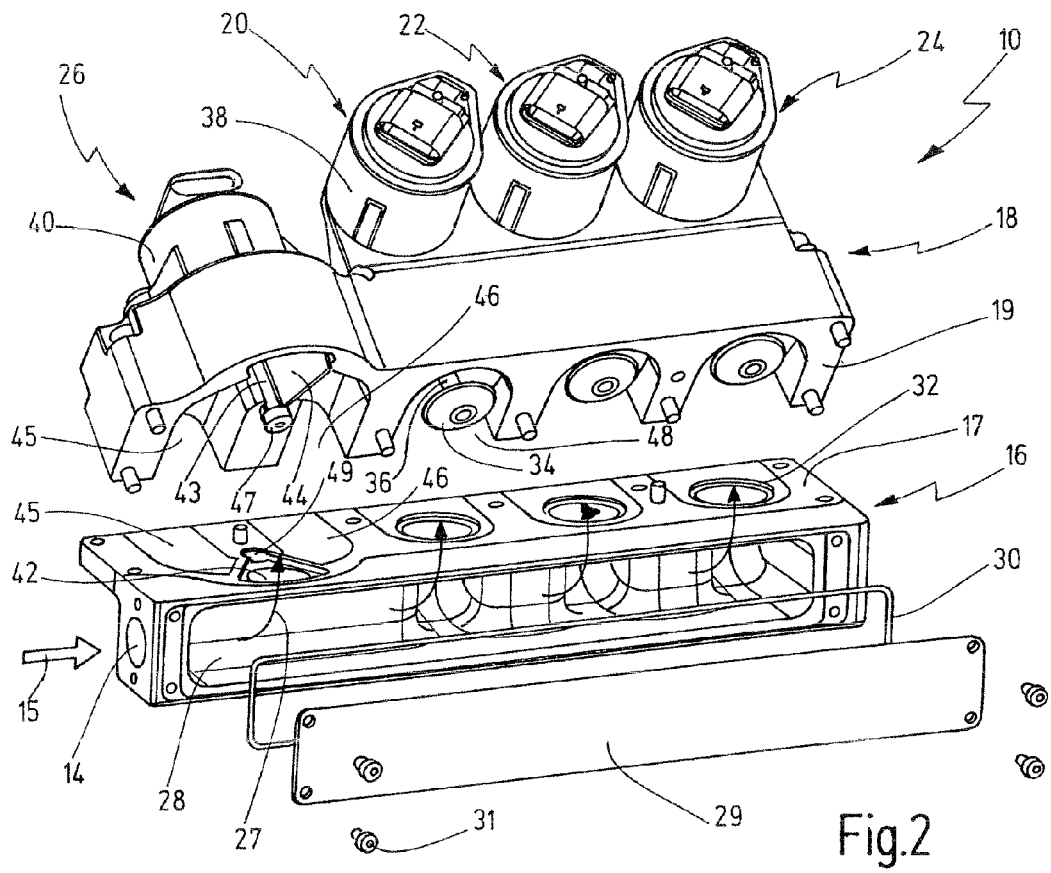
FIG. 2 shows an exploded view of the valve assembly according to FIG. 1.

The design of the individual assemblies is more clearly evident in the exploded view according to FIG. 2.

The first housing part 16 comprises a collecting chamber 28, which is supplied with air via an inlet 14, as indicated by the arrow 15. The collecting chamber 28 can be closed toward the outside via a removable cover 29, which is attached with four screws 31 with a seal 30 placed in between. The cover 29 therefore permits easy access to the collecting chamber 28 for the purpose of installation, cleaning, or repair.

The first joining surface 17, which is substantially flat, is provided on the top side of the first housing part 16. A valve inlet 42 for the valve 26 is formed in the direct vicinity of the inlet 14, wherein said valve inlet supplies air from the collecting chamber 28 directly into the valve 26 in the direction of the arrow 27.

Figure 3:
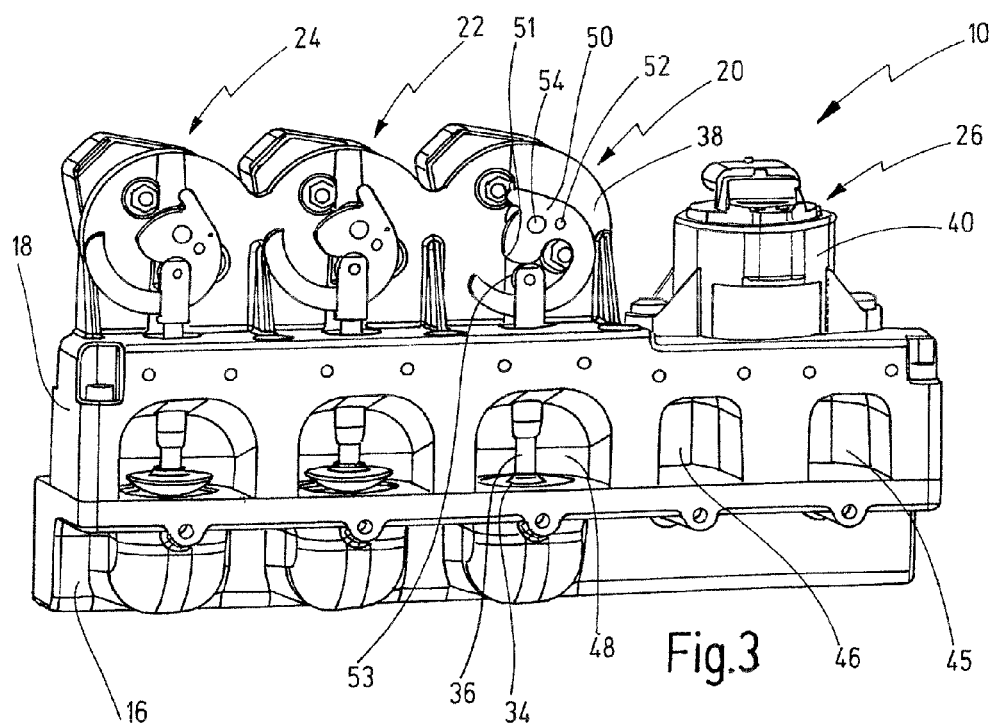
FIG. 3 shows a view of the valve assembly according to FIG. 1 from the back side, wherein the housing of the actuators of three adjacently arranged quantity control valves are opened, in order to permit a better view.

The valve 26 is designed as a switching valve, which, proceeding from the valve inlet 42, permits switching between two outlets 45, 46 (cf. also FIG. 3).

To this end, a valve shaft 43 is provided on the assigned second housing part 18, on which said valve shaft a valve flap 44 is retained. The valve shaft 43 is supported at the lower end by means of a bearing 47, which engages into an assigned recess 49 in the first housing part 16. The actuator 40 permits a continuous displacement of the valve shaft 43 between two end positions, in which the valve flap 44 completely closes the first outlet 45 or the second outlet 46 in a sealing manner, with any number of intermediate positions.

Following next to the switching valve 26, the three valves 20, 22, 24 are accommodated in the second housing part 18 and are embodied as continuously controllable air flow control valves. The valves 20, 22, 24 are embodied as disk valves and comprise valve disks 34, which are accommodated on valve tappets 36. The valve tappets 36 can be continuously displaced by means of the actuators 38, in order to allow the air flow proceeding from the collecting chamber 28 into an assigned outlet 48 on the back side of the second housing part 18 opposite the cover 29 (cf. also FIG. 3).

A valve seat 32 on the first housing part 16 is assigned to each valve 20, 22, 24 and is embodied as a recess in the first joining surface 17.

The valve seats 32 can therefore be very precisely formed at the first joining surface 17 in a simple and cost-effective manner.

The design of the disk valves 20, 22, 24 is more clearly evident in FIG. 3.

Each valve tappet 36 is continuously displaceable along a valve axis by means of the actuator 38, between a closed position (shown with valve 20 in FIG. 3) and an opened position (shown with the two valves 24, 22 in FIG. 3). To permit continuous displacement, the actuators 38 each comprise a rotary actuator 62 (FIG. 4), which permits continuous displacement of a shaft 54. A coupling device 50 in the form of a cam disk is accommodated on the shaft 54, by means of which a guide surface 53 on the upper end of the valve tappet 36 can be displaced via a control surface 51 according to control characteristics embodied by the control surface 51.

The arrangement is implemented such that the valve tappet 36 opens in the flow direction, i.e., in the direction of the gas pressure from the collecting chamber 28. Such an inverse arrangement results in a particularly low loss of pressure. The cam disk 50 is preloaded in the closing direction by means of a failsafe spring, which engages on the cam disk 50 and from which is visible its end 52 only. This means that each of the valves 20, 22, 24 is moved into its closing position if the rotary actuator 38 should fail.

The housing parts 16 and 18 are advantageously produced either of light metal, in particular in the form of an aluminum alloy, via die casting, or are produced of plastic in an injection molding procedure.

Figure 4:
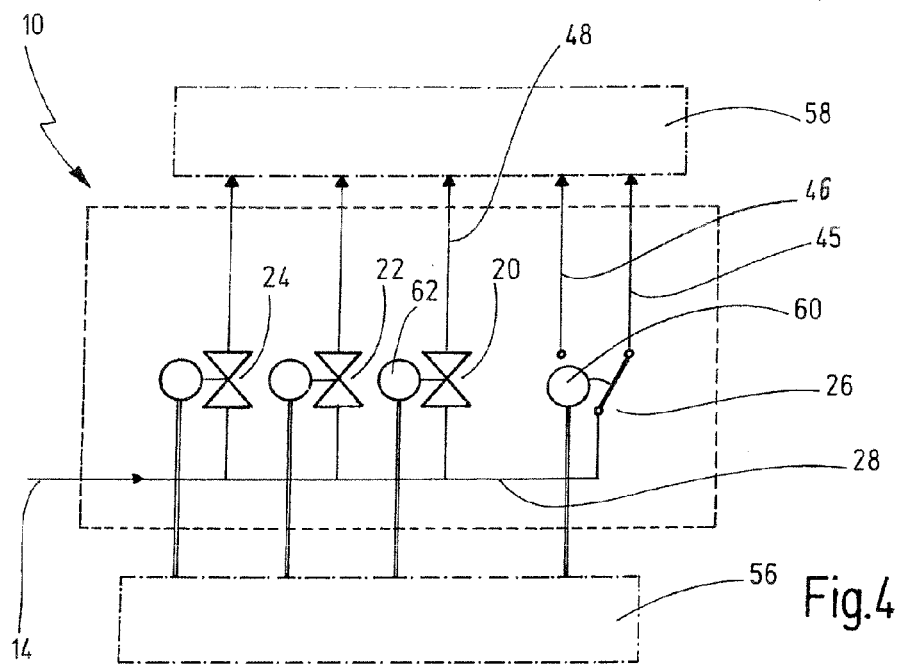
FIG. 4 shows a block diagram of the valve assembly according to the invention.

FIG. 4 shows a block diagram of the valve assembly 10.

The valve assembly 10 is used to supply air to a fuel cell module 58 comprising a regenerator, a burner, and a fuel cell. Central control electronics 56 are provided for the control of the valve assembly 10, via which the rotary actuators 62 of the assigned air flow control valves 20, 22, 24 are continuously controllable. The control electronics 56 also continuously controls a rotary actuator 60, by means of which the valve shaft 43 of the flap valve 26 is continuously displaceable, in order to allow the valve inlet 26 to switch between the two outlets 44, 45. All valves 20, 22, 24, 26 are supplied with incoming air via a common inlet 14 via the collecting chamber 28.

The outlets 46, 45 and 48 of the valves 26 and 20, 22, 24, respectively, are directly coupled to the assigned fuel cell module 58.

The rotary actuators 60, 62 are each provided with integrated position detection, in order to ensure a valve control being as accurate as possible.

Although several embodiments have been described in detail for purposes of illustration, various modifications may be made to each without departing from the scope and spirit of the invention. Accordingly, the invention is not to be limited, except as by the appended claims.

What is claimed is:

1. A valve assembly for supplying gas or air to a fuel cell, the valve assembly comprising:
   at least two individually controllable valves;
   a common housing, in which the at least two individually controllable valves are accommodated, the common housing comprising a common inlet and at least one outlet for each valve;
   wherein the common housing is formed of at least a first housing part and a second housing part;
   wherein the common inlet is formed in the first housing part, said common inlet being coupled to the at least two individually controllable valves; and
   wherein the at least two individually controllable valves are accommodated in the second housing part;
   wherein the first and second housing parts are sealed with respect to one another by means of assigned joining surfaces wherein at least one valve seat for a first valve of the at least two individually controllable valves is provided at a first joining surface of the first housing part, said at least one valve seat being closable by a sealing surface of the first valve;
   wherein one of the at least two individually controllable valves is a switching valve having two outlets, and in that a common valve inlet is disposed at the first joining surface of the first housing part.

2. The valve assembly according to claim 1, wherein the sealing surface of the first valve comprises a valve disk, which is disposed on a valve tappet.

3. The valve assembly according to claim 1, wherein at least one of the at least two individually controllable valves is continuously controllable by means of an actuator.

4. The valve assembly according to claim 1, wherein at least one of the at least two individually controllable valves is automatically controllable by means of a rotary actuator.

5. The valve assembly according to claim 4, wherein the rotary actuator comprises an integrated position detection.

6. The valve assembly according to claim 2, wherein the valve tappet is adjusted by means of a rotary actuator having a coupling device.

7. The valve assembly according to claim 6, wherein the coupling device is in the form of a cam disk.

8. The valve assembly according to claim 2, wherein the first valve opens in a flow direction of the gas or air and the first valve is acted upon by a spring in a closing direction, the closing direction opposite of the flow direction.

9. The valve assembly according to claim 8, wherein the spring comprises a failsafe spring.

10. The valve assembly according to claim 1, wherein the switching valve comprises a valve flap, which is actuated by means of a rotary actuator.

11. The valve assembly according to claim 1, wherein the common housing is made of metal or plastic.

12. The valve assembly according to claim 11, wherein the metal comprises aluminum alloy.

13. The valve assembly according to claim 1, wherein all of the at least two individually controllable valves have a valve inlet, which is formed at the first joining surface of the first housing part.

14. The valve assembly according to claim 1, wherein the first housing part encloses a collecting chamber coupled to the common inlet, said collecting chamber being closable by means of a cover.

15. A valve assembly for supplying gas or air to a fuel cell, the valve assembly comprising:
   a common housing formed of a first housing part coupled to a second housing part, where the first and second housing parts are sealed with respect to one another by mutually joined surfaces;
   wherein the first housing part comprises a collecting chamber having a single air inlet in airflow communication with at least two valve outlets;
   wherein the second housing part contains at least two valves configured to control an airflow through their respective valve outlets of the first housing part; and
   wherein at least one valve outlet of the at least two valve outlets is disposed along the mutually joined surface of the first housing part and the at least one valve outlet is closable by a sealing surface of its respective valve of the at least two valves;
   wherein one of the at least two valves is a switching valve having its own two outlets and a common valve inlet that is disposed at the mutually joined surface of the first housing part.

16. The valve assembly according to claim 15, wherein the switching valve comprises a valve flap, which is actuated by means of a rotary actuator.

* * * * *